United States Patent [19]

Hannam

[11] Patent Number: 4,856,222
[45] Date of Patent: Aug. 15, 1989

[54] REMOTELY CONTROLLED FISHING APPARATUS

[76] Inventor: Michael E. Hannam, 7 Creighton Street, Orillia, Ontario, Canada, L3V 1A9

[21] Appl. No.: 264,974
[22] Filed: Oct. 31, 1988
[51] Int. Cl.$^4$ .............................................. A01K 93/00
[52] U.S. Cl. ..................................... 43/26.1; 43/43.1; 43/4.5
[58] Field of Search ................... 43/26.1, 4, 4.5, 43.1, 43/43.13

[56] References Cited

U.S. PATENT DOCUMENTS

| | | |
|---|---|---|
| 2,912,782 | 11/1959 | Maximov . |
| 2,951,307 | 9/1960 | Joy . |
| 3,203,131 | 11/1962 | Myers .................................... 43/26.1 |
| 3,462,870 | 8/1969 | Terilli . |
| 3,599,370 | 8/1971 | Armata et al. . |
| 3,710,500 | 1/1973 | Dena ...................................... 43/26.1 |
| 3,793,761 | 2/1974 | Bonham .............................. 43/26.1 |
| 3,911,609 | 10/1975 | Baya ....................................... 43/26.1 |
| 4,161,077 | 7/1979 | Ciaccio et al. ......................... 43/26.1 |
| 4,339,888 | 7/1982 | Sheng-Jung .......................... 43/26.1 |
| 4,442,621 | 4/1984 | Kent ....................................... 43/26.1 |
| 4,635,391 | 1/1987 | Early ....................................... 43/26.1 |
| 4,648,194 | 3/1987 | Carroll, Jr. . |
| 4,757,633 | 7/1988 | Van Cleve ............................. 43/26.1 |

OTHER PUBLICATIONS

Applicant submits that his invention is distinguished over all of the above-listed prior art which fail to disclose a fishing apparatus comprising a bouyant hull having drive control means controlled by a radio drive signal and having a releasable fishing line attachment means mounted on the hull upwardly thereof.

Primary Examiner—Nicholas P. Godici
Assistant Examiner—Michael William Starkweather

[57] ABSTRACT

A fishing apparatus comprises a bouyant hull fitted with a propulsion motor and preferably a rudder. Servo-mechanisms controlled by a radio receiver receive radio signals from a remote location and function to control operation of the propulsion motor and the rudder. A mast extends upwardly from the hull and carries at its upper end an attachment means whereby a fishing line can be releasably attached to the apparatus. In use, a fishing line is attached to the apparatus which is then operated by radio control so that it becomes positioned at a location spaced apart from the fisherman. When a fish bites a lure carried by the line, the latter is automatically released by the apparatus allowing the fisherman to play and land the fish without interference with the apparatus. After landing the fish, the fisherman can retrieve the apparatus by radio control for further use.

2 Claims, 5 Drawing Sheets

REMOTELY CONTROLLED FISHING APPARATUS

FIELD OF THE INVENTION

The present invention relates generally to fishing apparatus.

BACKGROUND OF THE INVENTION

Trolling is a commonly used fishing procedure with particular utility in fishing for salmon or several of the trout species such as rainbow trout and brown trout. Trolling involves the dragging of a lure, bait or hook behind a slowly moving boat. Often the waters being trolled are very shallow and have good clear water visibility. Trout and salmon are well known to be boat-shy fish and consequently are generally frightened by the approaching boat and move to one side or the other to allow the boat to pass.

In an attempt to avoid this problem, it has been known to troll behind a boat with a very long length of line so to give the fish an opportunity to swim back into the line of trolling. Unfortunately, this then presents a further problem. The intrinsic stretchability of the extremely long length of line makes it difficult if not impossible to set the hook by suddenly jerking the line in a conventional manner.

These difficulties have heretofore been clearly recognized and attempts have been made to overcome them by the use of devices known as side-planers or planer-boards. Such a known device comprises a unit which is lowered into the water and attached to the boat by a line or cable. As the boat travels through the water, the planer cable is let out and the planer board moves into a position spaced some distance away from the boat and generally slightly behind the boat. The fishing line is attached to the planer board cable by an attachment means or a releasable clip which slides along the planer board cable until it reaches the planer board. The fishing line then extends from the boat out to the planer board and then rearwardly from the planer board to the hook. In this way, the hook is now travelling through the area of the water to which the fish have moved to avoid the boat. When a fish strikes the lure, the hook is easily set since the pressure exerted on the hook through the short length of line between the lure and the releasable clip is sufficient so to do. As soon as the pull on the line by the combined action of the fish and the forward movement of the planar board reaches a predetermined value, the clip automatically releases the line and the fisherman is then free to play and eventually land the fish.

While these known devices have improved a fisherman's chances of success in trolling, they unfortunately present further practical problems. In the first place, there is a great risk of the fishing line becoming entangled with the planer board cable while the fisherman is attempting to land the fish. To avoid this danger, it is customary to attempt to retrieve the planer board by winding it in on its cable as soon as the fishing line has been been released from the clip. Side planers are, however, very difficult to bring in since as they are drawn toward the boat, they resist such action and tend to move forwardly and often end up going around the front of the boat. Consequently, it is generally considered necessary to have two people in the boat - one to play the fish on the line and the other to bring in the planer board as quickly as possible to avoid entanglement of its cable by the fishing line.

Yet another practical problem with the use of planer boards, is that it is difficult to turn the boat from a straight path. For example, if the boat is turned toward the planer board, the cable will become slack and the planer board will simply lie motionless in the water until the slack in the cable is eliminated. On the other hand, if the boat is turned away from the planer board, the speed of the latter will greatly increase and the tension on the clip may be sufficient to result in premature undesired release of the fishing line from the clip.

It will now be understood that, while planer boards have greatly improved the art of trolling to a very considerable degree, their use still presents certain practical difficulties.

It is accordingly an important object of this invention to provide an improved fishing apparatus which is especially suited for use in trolling.

Yet another object of this invention is to provide a fishing apparatus which, when used in trolling, eliminates many if not all of the problems encountered in the use of planer boards resulting from the possible entanglement of the fishing line with the planer board cable.

Other objects of the invention will become apparent as the description herein proceeds.

SUMMARY OF THE INVENTION

A fishing apparatus in accordance with this invention can broadly be defined as comprising a bouyant hull; propulsion means on the hull for propelling the hull through a body of water; drive means associated with the propulsion means for causing operation thereof; drive control means associated with the drive means for controlling operation thereof; drive signal-receiving means associated with the drive control means and operative to receive a radio drive signal from a transmitter means disposed at a position distanced from the hull and, in response to such a drive signal, to control operation of the drive control means; and a fishing line attachment means mounted on the hull upwardly thereof for releasably engaging a fishing line between ends thereof and adapted to release the fishing line when a predetermined force is applied through the fishing line to the attachment means.

A fishing apparatus in accordance with this invention normally additionally comprises steering means such as a rudder for controlling the direction of movement of the hull through a body of water; steering control means associated with the steering means for controlling operation thereof; and steering signal-receiving means associated with the steering control means and operative to receive a steering radio signal from a transmitter means disposed at a position distanced from the hull and, in response to such a steering signal, to control operation of the steering control means.

The hull of a fishing apparatus in accordance with this invention is usefully formed with integrally formed wall members defining a compartment and a deck member removably secured to the wall members to provide a closed water-tight compartment, the drive means, the drive control means and the drive signal-receiving means, and, if provided, the steering control means and the steering signal-receiving means being disposed within that compartment. Normally, a water-sealing gasket means will be provided between the wall members and the deck member to prevent the entry of water into the hull during use of the apparatus.

The fishing line attachment means of a fishing apparatus in accordance with this invention will preferably be supported at an upper end of a mast mounted on the hull and extending upwardly therefro. It is particularly advantageous for the fishing line attachment means to be rotatably mounted on the mast at the upper end thereof for unrestricted rotation relative thereto.

While numerous different types of releasable fishing line attachment means can be used in a fishing apparatus in accordance with this invention, such an attachment means will normally include a retention force adjusting means whereby the attachment means can be adjusted to vary the predetermined force necessary to be applied thereto through a fishing line to cause release of such a fishing line from the attachment means.

In one design for such a fishing line attachment means, there is provided a generally cylindrical member pivotally mounted for movement downwardly from an engaged position in which it extends upwardly and outwardly with respect to the mast to a released position in which it extends generally downwardly, the cylindrical member being adapted to have a fishing line wound therearound when such fishing line is releasably engaged thereby.

Such a fishing line attachment means usefully comprises a retention force adjusting means movably mounted thereon and releasably engaging the generally cylindrical member at an outer end thereof, so that the position of the retention force adjusting means can be adjusted relative to the generally cylindrical member to vary the predetermined force necessary to be applied through a fishing line to cause release of the generally cylindrical member from the retention force adjusting means in turn to permit free movement of the generally cylindrical member downwardly from it engaged position into its released position.

In order to ensure free movement of the fishing line over the apparatus and to prevent entanglement of such line, the deck member of such a fishing apparatus is usefully defined exclusively by outer surfaces facing uypwardly and outwardly thereby to permit free movement across the deck member of a fishing line releasably engaged by the fishing line attachment means.

In using a fishing apparatus in accordance with this invention in trolling, the fishing line is first attached to the attachment means of the apparatus. A remote control radio transmitter aboard the fishing boat is then used to cause operation of the propulsion means and the steering means, if provided, to move the apparatus to an appropriate position relative to the boat, for example, to the side and slightly forwardly of the boat. At this time, the fishing line carrying the hook or lure is dragged through the water behind the fishing apparatus and in which water the fish are present not having been frightened away by the boat itself. When a fish bites and consequently applies adequate tension to the line, the attachment means causes the line to be released then permitting the fisherman to play and land the fish without having to pay further attention to the fishing apparatus and without having to be concerned about the fishing line becoming entangled with any other cables. More details of the manner in which the apparatus is used in trolling and other features of the invention and the advantages presented thereby will become apparent as the description herein proceeds.

The various features of novelty which characterize the invention are pointed out with more particularity in the claims annexed to and forming a part of this disclosure. For a better understanding of the invention, its operating advantages and the specific objects attained by its use, reference should be had to the accompanying drawings and descriptive matter in which there are illustrated and described preferred embodiments of the invention.

BRIEF DESCRIPTION OF THE DRAWING

The invention will now be described merely by way of illustration with reference to the accompanying drawings in which.

DESCRIPTION OF A PREFERRED EMBODIMENT

Figure 1:
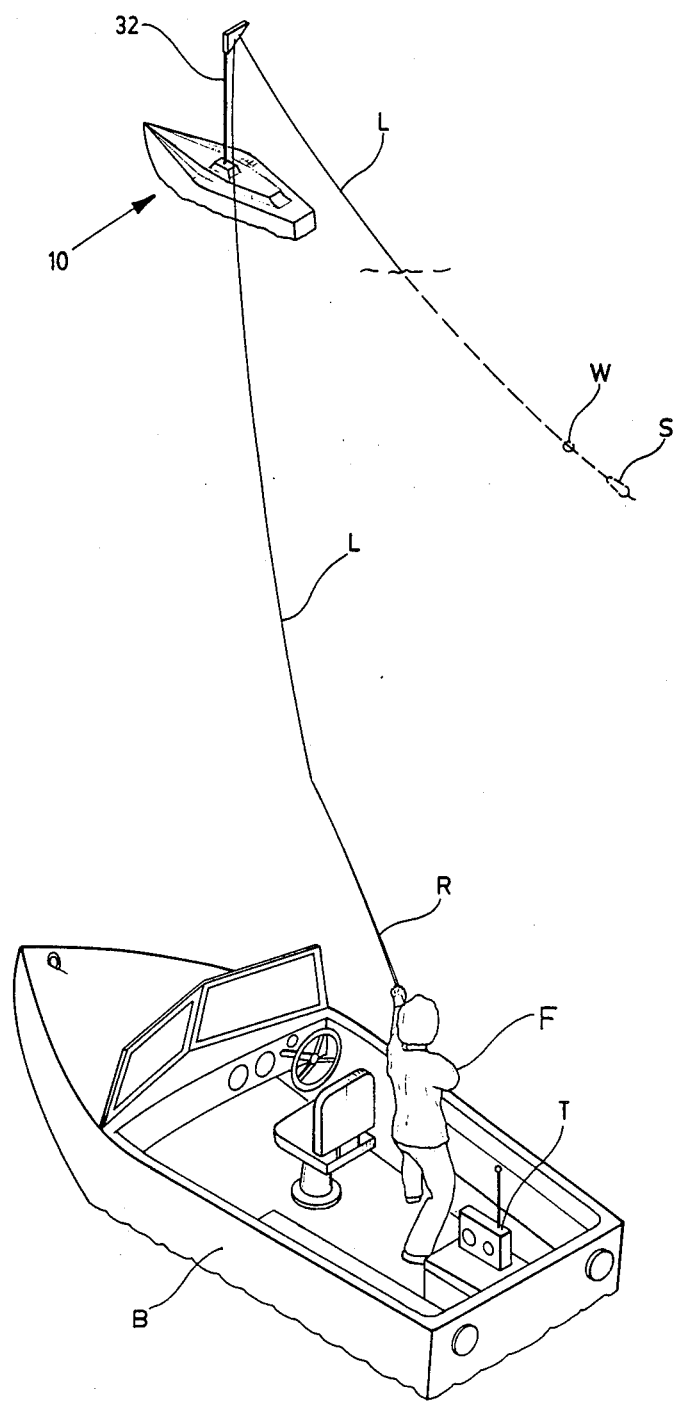
FIG. 1 is a somewhat schematic illustration showing the use of one embodiment of a fishing apparatus in accordance with the invention.

Referring first to FIG. 1 of the accompanying drawings, one embodiment of a fishing apparatus in accordance with the invention is indicated generally threin at 10. The apparatus is shown in that figure as being used by a fisherman F from a power boat B using a 2-channel radio control transmitter T of conventional design. The fisherman F is shown as angling using a rod R and a line L, the latter carrying generally at its free end a weight W and lure or spoon S. Since the rod R, line L, weight W, spoon S, boat B and transmitter T do not form part of this invention, they will not be described in greater detail.

Figure 2:
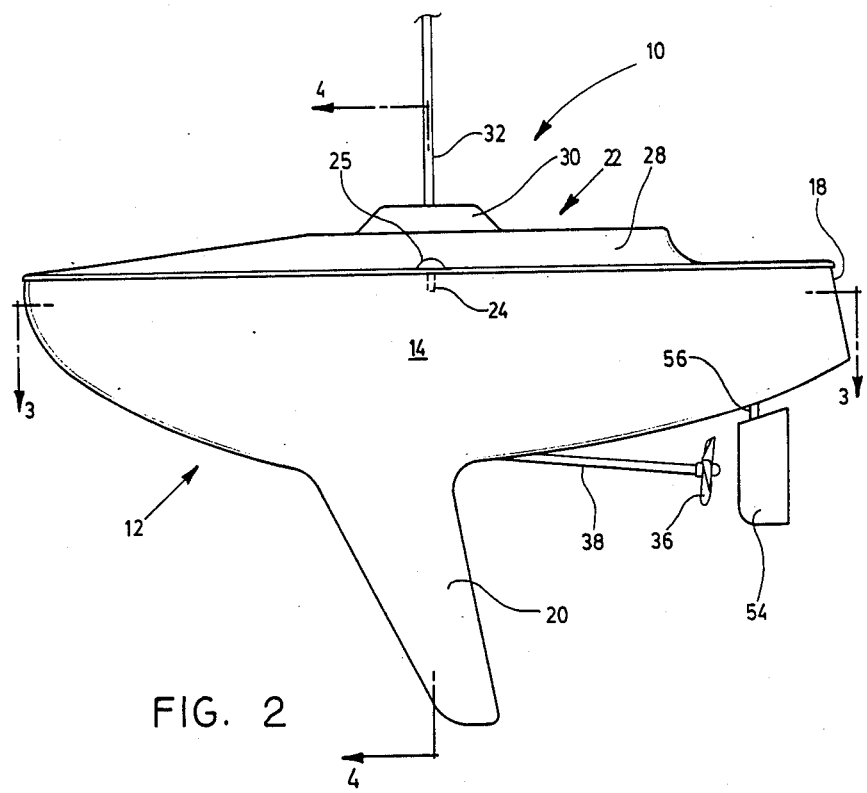
FIG. 2 is a side elevation of the fishing apparatus shown in FIG. 1.
Figure 3:
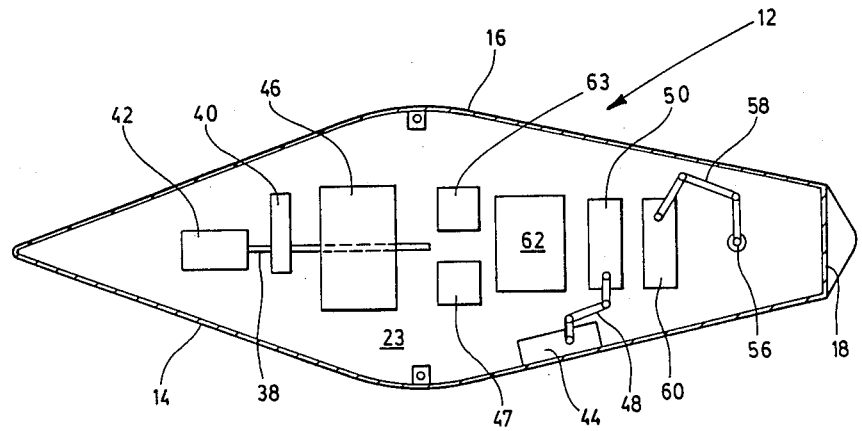
FIG. 3 is a horizontal sectional view through the apparatus shown in FIG. 2 when taken as indicated by the arrows 3—3 of that figure.
Figure 4:
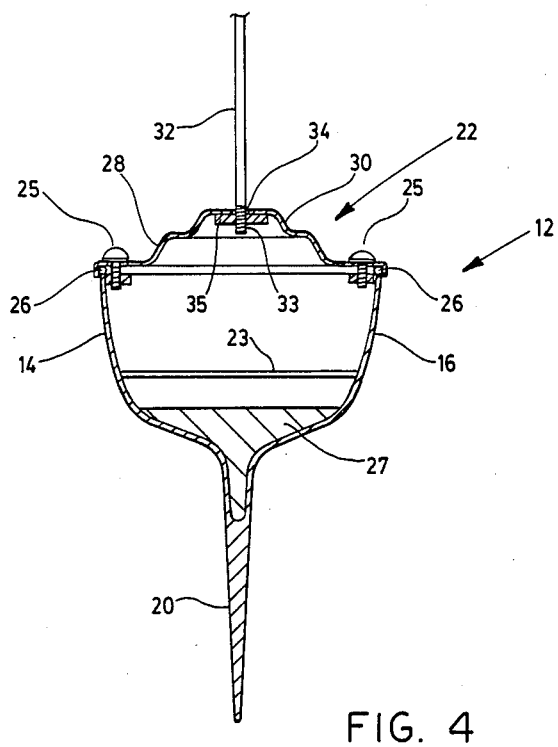
FIG. 4 is a fragmentary vertical sectional view through the hull of the apparatus shown in the preceding figures when taken as indicated by the arrows 4—4 of FIG. 2 and with certain internal parts omitted.

Referring now to FIGS. 2, 3 and 4, it will be seen that the fishing apparatus 10 comprises a unitary moulded bouyant hull generally indicated at 12 usefully manufactured from a glass fibre-reinforced resin composition. The hull 12 comprises side walls 14 and 16, a transom 18 and a keel 20 although other hull designs and constructions are equally within the scope of this invention.

The hull 12 has an open top and is closed by a deck or cover member generally indicated at 22 and secured to the hull 12 by small bolts 24 having knurled convex heads 25. Other suitable releasable fastening means can also be used. The cover 22 is also usefully formed of a glass fibre-reinforced resin composition. A sealing gasket 26 is generally provided between the cover 22 and the hull 12 to prevent the entry of water into the interior of the apparatus.

Within the hull 12, there is usefully provided a shelf 23 on which various internal components yet to be described are mounted. Below the shelf 23 and within the keel 20 appropriate ballast 27 will usually be provided to maintain the apparatus 10 in an upright position during use.

In accordance with a preferred feature of this invention and for a reason which will become apparent as the description herein proceeds, the cover 22 is usefully formed with an elevated longitudinally extending portion 28 generally centrally of which there is provided a mast-supporting platform 30. It will be noted that the cover 22 including the portion 28 and the platform 30 is formed as a unitary moulded structure having smooth outer surfaces and presenting no sharp corners or edges. In general, it can be stated that the cover 22 is usefully defined exclusively by outer surfaces which face upwardly and outwardly. In this way, the fishing line L cannot become snagged on the hull 12 or cover 22 but is instead free to slide across the hull 12 and cover 22. The convex heads 25 of the bolts 24 also minimize the risk of the line L becoming snagged thereon.

Mounted on the platform 30, there is provided an upstanding mast 32 which, in the embodiment illustrated is provided with a threaded lower end 33 removably received through opening 34 in platform 30 in a nut 35 bonded in any appropriate manner to the undersurface of the platform 30 as will readily be understood by reference to FIG. 4.

Figure 5:
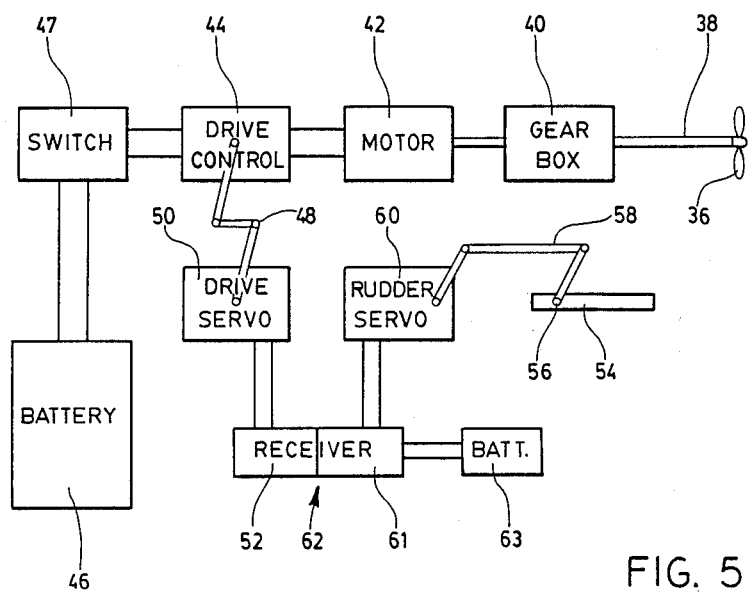
FIG. 5 is an electrical circuit diagram showing the interconnection of the various component parts shown in FIG. 3.

The apparatus 10 also comprises a propulsion means which, in the embodiment illustrated, is a propeller 36 mounted on a propeller shaft 38 which extends through the hull 12. It will be understood that a suitable watertight seal will be provided in any conventional manner around the shaft 38. The shaft 38 extends forwardly to a gear box 40 which is in turn coupled to a battery-operated drive means or motor 42. The drive motor 42 is in turn connected to a drive control means 44 as will be more readily understood by reference to FIG. 5. Power for operation of the motor 42 is provided by a battery indicated at 46 and controlled by a manually operated switch 47. If desired, a water-proof switch mounted on the exterior of the hull 12 may be provided.

The drive control means 44 is shown in the drawings as being an electro-mechanical device which is in turn controlled through a mechanical linkage 48 by a drive control servo-mechanism 50 is in turn controlled by a drive servo-mechanism 50 is in turn controlled by a drive signal-receiving means 52 (FIG. 5) which is operated to receive a radio drive signal as transmitted from the transmitter T by the fisherman F. It will also be understood that the signal received by the drive signal receiving means 52 may be such as to initiate or terminate rotation of the propeller 36 and to control the rotational speed of the propeller 36. It is also possible to utilize a totally electronic speed control device instead of the electro-mechanical device shown in the drawings.

It should perhaps be indicated at this juncture that the electrical interconnections between the various electrical components contained within hull 12 are omitted from FIG. 3 to facilitate understanding of that figure.

The apparatus 10 is also shown in the accompanying drawings as being provided, as will generally be the case, with a steering means or rudder 54 for controlling the direction of movement of the apparatus 10 through the water. In the embodiment illustrated, pivotal movement of the rudder 54 about its rudder shaft 56 is shown as being controlled by a mechanical linkage 58 extending from a steering control means or steering servo-mechanism 60, the operation of which is in turn controlled by a steering signal-receiving means 61 which is operative to receive a radio steering signal as transmitted by the transmitter T under the control of the fisherman F.

The two receivers 52 and 61 are shown in FIG. 3 as being contained within a 2-channel radio receiver 62 powered by a battery 63.

Figure 6:
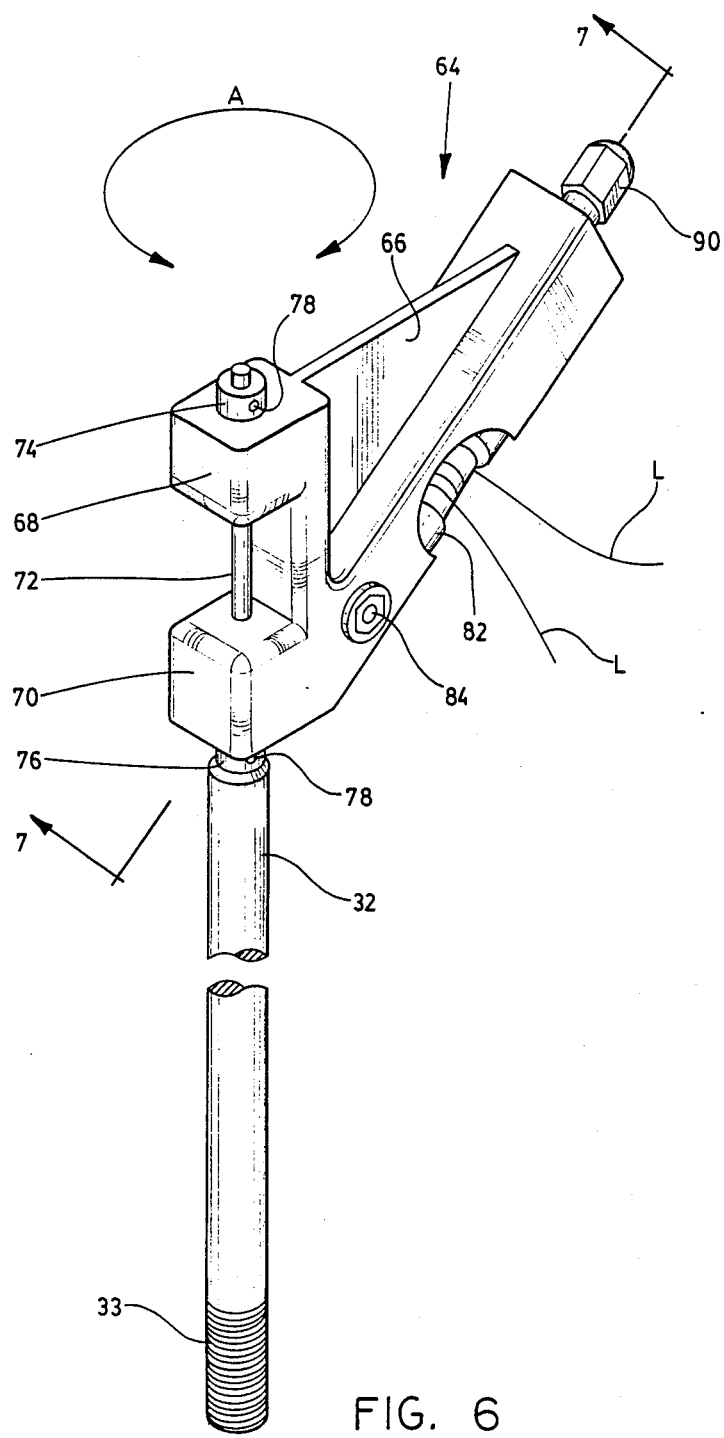
FIG. 6 is a perspective view on an enlarged scale showing a releasable fishing line attachment means forming part of the apparatus shown in the preceding figures with that attachment means in its engaged position.
Figure 7:
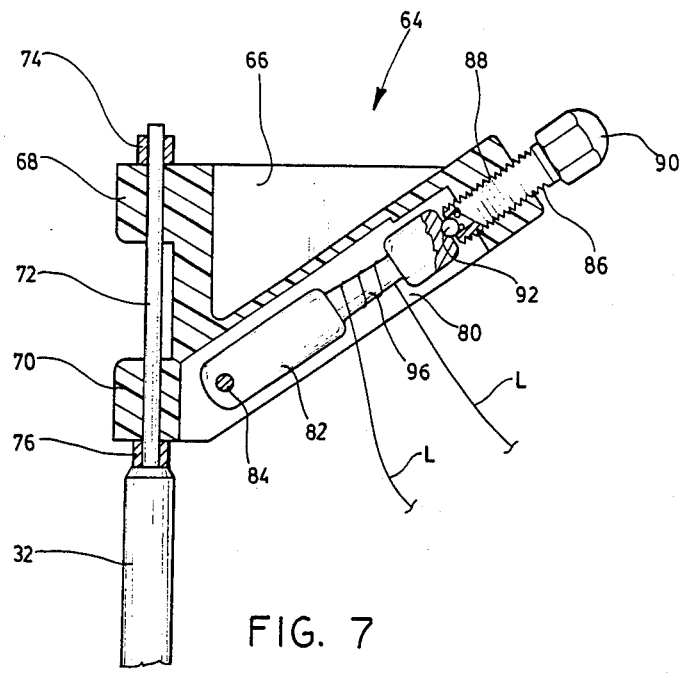
FIG. 7 is a sectional view when taken as indicated by the arrows 7—7 of FIG. 6.
Figure 8:
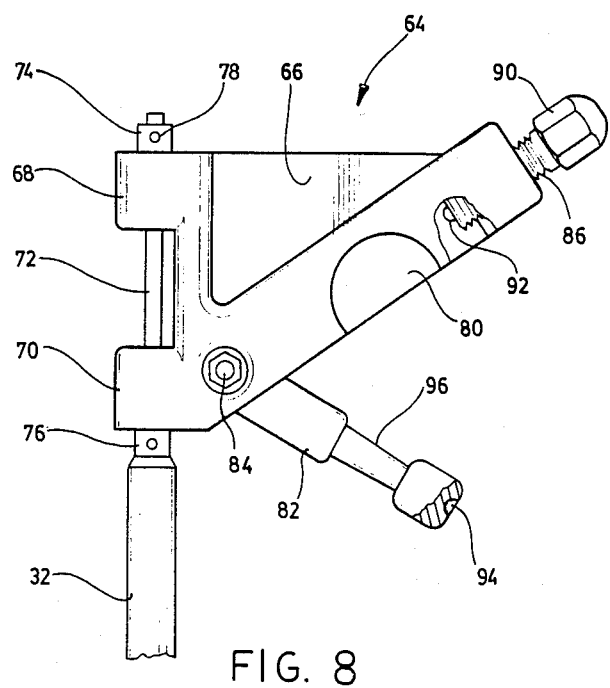
FIG. 8 is a side elevation partly in section of the fishing line attachment means in its released position.

Referring now to FIGS. 6, 7 and 8 of the drawings, it will be seen that the fishing apparatus 10 also comprises a fishing line attachment means generally indicated at 64. In the particular construction shown in the drawings, the attachment means 64 comprises a generally triangular body 66 having upper and lower collars 68 and 70 respectively which are rotatably supported by a shaft member 72 extending upwardly from the upper end of the mast 32. The body 66 is thus free to rotate in both directions around the shaft member 72 as indicated by the double-headed arrow A.

The attachment means 64 is retained in position by upper and lower bushings 74 and 76 respectively which are releasably secured to the shaft 72 by grub screws 78.

Along the lower sloping edge of the triangular body 66, the attachment means is formed with a square-sectioned compartment 80 within which there is received a generally cylindrical member 82 carried by a transverse shaft 84 in turn pivotally mounted on the body 66. The cylindrical member 82 is thus free to move between the engaged position shown in FIGS. 6 and 7 and the released position shown in FIG. 8.

In order releasably to retain the cylindrical member 74 in its engaged position, the attachment means 64 also comprises a retaining member 86 which is screwed into a threaded bore 88 provided for such purpose in the body 66. The retaining member 86 has a convex hexagonal head 90 by means of which it may be manually rotated. At its opposite end, the retaining member 86 is formed with a generally spherical detent tip 92 of resilient material, such as hard rubber, which is releasably received within a hemispherical recess 94 formed for such purpose in the free end of the generally cylindrical member 82.

Between its two ends, the generally cylindrical member 82 is formed with a reduced diameter portion 96 around which the fishing line is wound a few times as will readily be understood by reference to FIG. 7 for a purpose which will be more readily understood as the description herein proceeds.

The manner in which the fishing apparatus 10 is used will now be described. For such use, a fisherman F first removes the deck or cover 22 from the hull 12 by removing the bolts 24. The switch 47 is then closed to provide power to the drive motor 42 and, if a switch is provided on the receiver 62, that switch is also closed. The cover 22 is then replaced and secured in position using the bolts 24, the gasket 26 ensuring a water-tight seal with the hull 12. It will be understood that, if such switches are mounted on the exterior of the hull 12, it will not then be necessary to remove the cover 22 every time it is desired to use the apparatus 10. In such an embodiment, the bolts 24 can then be countersunk into the cover 22 to further minimize the risk of their becoming entangled with the line L.

The fishing line attachment means 64 is now adjusted by turning the hexagonal head 90 until a desired predetermined force is required to release the cylindrical member 82 from its engagement with the retaining member 86. With the cylindrical member 82 in its released position (FIG. 8), the fishing line is then wound around the reduced diameter portion 96 of the cylindrical member two or three times at a desired distance from the free end of the line. The cylindrical member 82 is then returned into its engaged position as shown in FIGS. 6 and 7. The apparatus 10 is then placed in the water alongside the boat B and the transmitter T is operated to cause operation of the drive motor 42 and the rudder 54 so that the apparatus 10 is moved to a position some distance from the boat B. During such movement of the apparatus 10, the fisherman plays out the fishing line L from his rod R.

Once the apparatus is in the desired position relative to the boat B, the fisherman then operates the transmitter T so that the apparatus 10 remains in the desired relative position during further movement of the boat.

As previously explained, the separation of the apparatus from the boat essentially completely eliminates the fish being alarmed by the existance or movement of the boat B. To minimize the extent to which the fish might be alarmed, the apparatus 10 will normally be operated so as to be positioned to one side or the other of the boat and a short distance ahead of that boat.

When a fish bites and consequently applies adequate tension to the fishing line L, the cylindrical member 82 of the fishing line attachment means 64 is caused to be released from its engagement with the retaining member 86 and moves into its released position as shown in FIG. 8. The line L then slips off the end of the cylindrical member 82 and the fisherman F is free to play and land the fish without further concern as to the existence of the apparatus 10.

During this period, the transmitter T can be used to terminate operation of the drive motor 42 so that the apparatus 10 simply lies motionless in the water.

Having landed the fish, the transmitter T is then operated to cause the apparatus 10 to return to a position alongside the boat B for further use if required.

It will now be understood that, while the line L is attached to the apparatus 10 by the attachment means 64, the line L is free to swing into any position relative to the apparatus 10. Such free movement is permitted since the body 66 of the attachment means 64 is mounted for free rotational movement in either direction into any position relative to the mast 32. Additionally, the described structure for the upper surface of the deck 22 and the convex heads 25 of the bolts 24 prevent any entanglement of the line L during such movement of the line L It will be noted that, as already indicated, the apparatus 10 is shown in FIG. 1 as being positioned forwardly of the boat B. It will of course be understood that the apparatus can be used in any desired position relative to the boat B. Additionally, while the apparatus 10 has hereinbefore been described as being operated so as to maintain it in a fixed position relative to the boat B during the trilling operation, it is also possible to vary the speed of the apparatus 10 or even to change its direction of travel. Such speed and/or direction changes are often sufficient to trigger a fish to strike at the lure.

It is also within the scope of the invention to utilise the apparatus 10 other than for trolling. It is, for example, possible to use the apparatus 10 from a fixed location such as the shore of a lake or a river bank. In this way, it is possible to carry a lure to a position removed from the shore a distance which would not be possible to reach simply by casting from the shore.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A fishing apparatus which comprises:
   a bouyant hull in turn comprising:
      integrally formed wall members defining a compartment and a deck member removably secured to said wall members to provide a closed watertight compartment and in which said deck member is defined exclusively by outer surfaces facing upwardly and outwardly thereby to permit free movement across said deck member of a fishing line;
   propulsion means on said hull for propelling said hull through a body of water;
   drive means associated with said propulsion means for causing operation thereof;
   drive control means associated with said drive means for controlling operation thereof;
   drive signal-receiving means associated with said drive control means and operative to receive a radio drive signal from a transmitter means disposed at a position distanced from said hull and, in response to such a drive signal to control operation of said drive control means;
   steering means for controlling the direction of movement of said hull through a body of water;
   steering control means associated with said steering means for controlling operation thereof;
   steering signal-receiving means associated with said steering control means and operative to receive a steering radio signal from a transmitter means disposed at a position distanced from said hull and, in response to such a steering signal, to control operation of said steering control means, and in which said drive means, said drive control means, said drive signal-receiving means, said steering control means, and said steering signal-receiving means are disposed within said compartment;
   a mast mounted on said deck member and extending upwardly therefrom;
   a fishing line attachment means rotatably mounted on said mast at an upper end thereof for unrestricted rotation relative thereto and for releasably engaging a fishing line between ends thereof, adapted to release said fishing line when a predetermined force is applied through said fishing line to said attachment means and in turn comprising:
      a generally cylindrical member pivotally mounted for movement downwardly from an engaged position in which it extends upwardly and outwardly with respect to said mast to a released position in which it extends generally downwardly, said cylindrical member being adapted to have a fishing line wound therearound when such fishing line is releasably engaged thereby; and
      retention force adjusting means whereby the attachment means can be adjusted to vary the predetermined force necessary to be applied thereto through a fishing line to cause release of such a fishing line from said attachment means.

2. A fishing apparatus as claimed in claim 1, in which said retention force adjustment means is movably mounted on said fishing line attachment means and releasably engages said generally cylindrical member at an outer end thereof, and in which the position of said retention force adjustment means can be adjusted relative to said generally cylindrical member so to vary the predetermined force necessary to be applied through a fishing line to cause release of said generally cylindrical member from said retention force adjustment means in turn to permit free movement of said generally cylindrical member downwardly from its engaged position into its released position.

* * * * *